UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

957,125.  Specification of Letters Patent.  Patented May 3, 1910.

No Drawing. Application filed May 12, 1909, Serial No. 495,475. Renewed March 18, 1910. Serial No. 550,299.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dyestuffs, of which the following is a specification.

My invention relates to the production of new anthracene derivatives. They are obtained by converting an aminoanthraquinone into its derivatives containing substituted benzoyl groups. The reaction is carried out by treating an aminoanthraquinone with a substituted carboxylic acid of the benzene series or a suitable derivative thereof.

The new products are after being dried and pulverized colored powders practically insoluble in water; soluble in concentrated sulfuric acid with from a yellow to red to brown color. They yield on treatment with hydrosulfite and caustic soda lye from orange to red to brown vats suitable for dyeing and printing the textile fiber from yellow to red to brown shades. They also form valuable lakes.

In order to illustrate the new process I can proceed as follows, the parts being by weight:—10 parts of 1-aminoanthraquinone are heated to 125° C. with 100 parts of nitrobenzene and 8 parts of salicylic acid. 7 parts of thionyl chlorid are then added to the mixture heated to 125° C. The new condensation product crystallizes from the cooling liquid. It is filtered off, washed with alcohol and dried. It is soluble in pyridin with a yellow color, in concentrated sulfuric acid with an orange color. By treatment with hydrosulfite and NaOH a yellow-red vat is obtained which dyes cotton wool or silk greenish-yellow shades.

Other aminoanthraquinones may be used. Products of similar qualities are thus obtained, *e. g.* the condensation products obtained from 1.5-diaminoanthraquinone and salicylic acid (dyes yellow), 1.5-diaminoanthraquinone and anisic acid (dyes yellow-orange), 1-aminoanthraquinone and thiosalicylic acid (dyes yellow), 1.5-diaminoanthraquinone and para-nitro-benzoyl chlorid (dyes yellow-brown), 1.5-diaminoanthraquinone and meta-cyanobenzoic acid (dyes yellow), 1.4-amino-oxyanthraquinone and ortho-chlorobenzoic acid (dyes brown).

I claim:—

1. The herein described new vat dyestuffs of the anthracene series which are aminoanthraquinones containing substituted benzoyl groups which dyestuffs are, after being dried and pulverized, colored powders practically insoluble in water, soluble in concentrated sulfuric acid with a yellow to red to brown color; giving from orange to red to brown vats with hydrosulfite and caustic soda lye, which vats dye the textile fiber from yellow to red to brown shades, substantially as described.

2. The herein described new vat dyestuff of the anthracene series which is the ortho-oxy-benzoyl-1-aminoanthraquinone, which dyestuff is, after being dried and pulverized, a yellow powder which is soluble in pyridin with a yellow color; soluble in concentrated sulfuric acid with an orange color; giving a yellow-red vat with hydrosulfite and caustic soda lye, which vat dyes the textile fiber beautiful greenish-yellow shades, substantially as described.

In testimony whereof I have hereunto set my hand in the presence of two subscribing witnesses.

PAUL THOMASCHEWSKI. [L. S.]

Witnesses:
  OTTO KÖNIG,
  C. J. WRIGHT.